United States Patent [19]

Romeo et al.

[11] 4,380,716

[45] Apr. 19, 1983

[54] EXTERNAL MAGNETIC FIELD COMPENSATOR FOR A CRT

[75] Inventors: Arthur L. Romeo; Robert T. Bonelli, both of Greenlawn; Harvey E. Fishman, Brooklyn, all of N.Y.

[73] Assignee: Hazeltine Corporation, Greenlawn, N.Y.

[21] Appl. No.: 309,947

[22] Filed: Oct. 9, 1981

[51] Int. Cl.³ ............................................ H01J 29/06
[52] U.S. Cl. ........................................ 315/8; 315/370
[58] Field of Search .................. 315/8, 370; 250/491.1

[56] References Cited

U.S. PATENT DOCUMENTS 4,035,654 7/1977 Elmer ............................. 250/491.1

Primary Examiner—Harold A. Dixon
Attorney, Agent, or Firm—E. A. Onders; F. R. Agovino

[57] ABSTRACT

Light sensors with red filters are located at four corners of a CRT out of view of the operator. A red raster is generated in the corners of the CRT, the pattern of the raster corresponding to the area covered by the sensors. A pair of coils is located about the face of the CRT in a Helmholtz configuration and are driven by a current generator in response to the sensor output to maximize sensor output, thereby generating a compensating magnetic field which cancels external axial fields affecting the CRT.

21 Claims, 7 Drawing Figures

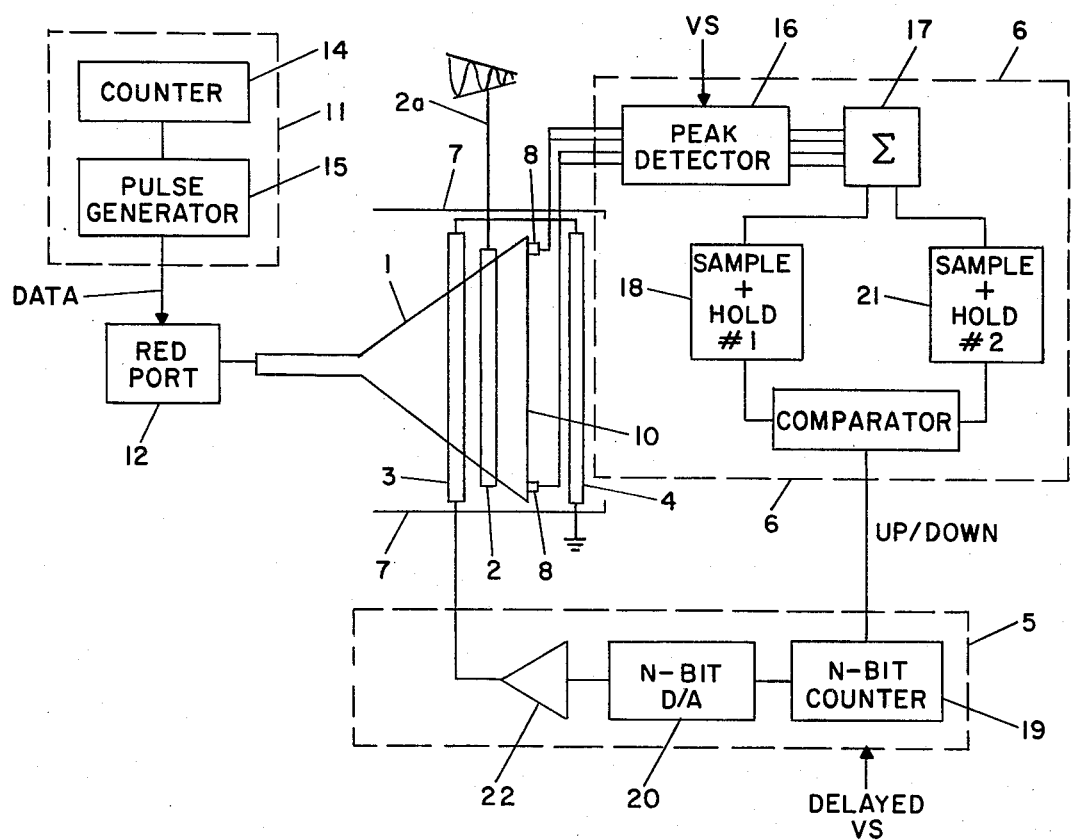
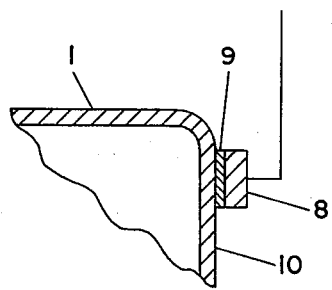
FIG. 2
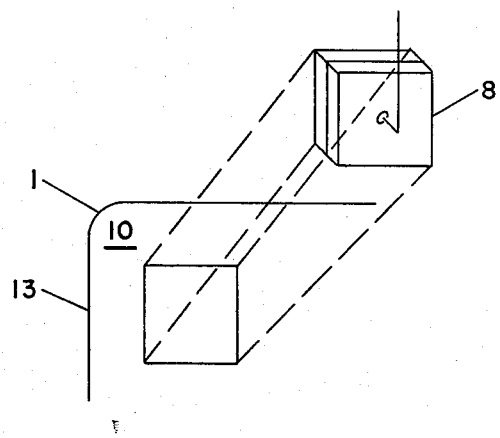
FIG. 3
FIG. 1

EXTERNAL MAGNETIC FIELD COMPENSATOR FOR A CRT

The U.S. Government has rights in this invention pursuant to Contract No. DAAK20-79-C-0284 awarded by the Department of the Army.

BACKGROUND OF THE INVENTION

1. Field of the Invention

The invention relates generally to the automatic cancellation of external magnetic fields and, in particular, to apparatus for compensating for an external magnetic field affecting the operation of a cathode ray tube (CRT) display.

2. Description of the Prior Art

Frequently it is necessary to operate a CRT display in the presence of a five gauss axial external magnetic field. With only a degaussing network in conjunction with a shield around the CRT, a 1.5 to 2 gauss axial field may be effectively cancelled. It has been suggested that Hall effect devices and fluxgate transformers may be used in conjunction with active circuitry to cancel external magnetic fields. However, these methods are very complex and high in cost.

SUMMARY OF THE INVENTION

It is an object of this invention to provide an apparatus for cancelling an external magnetic field affecting a CRT.

The invention comprises means for generating a reference display of a given color in a predetermined area on the face of the CRT during a field displayed on the CRT. Means for generating a compensating magnetic field about the CRT is provided. Means for controlling the strength of the compensating magnetic field functions in response to means for sensing an optical characteristic of the reference display and generating an output signal representative thereof.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a diagram in block form illustrating an apparatus for cancelling an external magnetic field applied to a CRT in accordance with the invention.

FIG. 2 is a partial sectional view of a corner of a CRT having a photosensor and red filter mounted thereon.

FIG. 3 is a partial view of a corner of a CRT illustrating a relationship between a reference area on the CRT and a photosensor for detecting the color characteristics of the reference area.

DETAILED DESCRIPTION OF THE INVENTION

Figure 4:
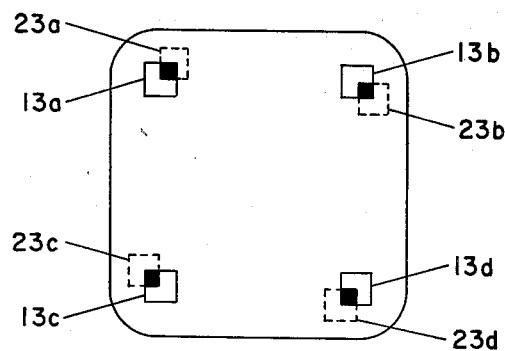
FIGS. 4–7 are various views of the face of a CRT during different fields, illustrating the patterns which will occur during a compensation process according to the invention.

In order to completely negate the effects of an external axial magnetic field on a high resolution color CRT, simple shielding methods can be employed. However, the shield must protrude past the plane of the CRT face by a distance which is a function of the amplitude of the external magnetic field. For fields of the order of 5 gauss, the shield must protrude a distance somewhat greater than three inches. This results in a tunnel effect for the operator of the CRT and is unacceptable.

FIG. 1 illustrates CRT 1 in combination with a block diagram of circuitry according to the invention for cancelling external magnetic fields affecting CRT 1. As in the prior art, CRT 1 is provided with a degaussing coil 2 having a damped sine wave 2a of current at approximately 350 Hz applied during a time interval of one field (16.67 milliseconds) every ten seconds. This prior art degaussing function fully corrects for horizontal and vertical external magnetic fields and partially corrects for axial external magnetic fields.

Operating simultaneously with degaussing coil 2, alternately wound coils 3, 4 are activated by current generator 5 to create a linear axial magnetic field, such as oppositely wound coils in a Hemholtz configuration. Current generator 5 eliminates interaction between degaussing coil 2 and coils 3, 4 which may give rise to incomplete degaussing of the display. Coils 3, 4 are connected in series and are located within the shield 7 of CRT 1 which minimally projects beyond the face 10 of CRT 1. An axial field is created between coils 3 and 4 which "bucks" or cancels any axial magnetic field which is not counteracted by degaussing coil 2. Current generator 5 is a high impedance device and applies a current to coils 3, 4 in response to maximizing circuit 6.

The invention includes the use of sensors 8 on the face 10 of CRT 1, preferably, out of view of the operator and in the four corners of the face 10. A raster is generated in the areas where the sensors 8 are located and the sensors 8 respond to the light created by the raster. The sensors 8 monitor an optical characteristic of CRT 1 such as light intensity or color purity. Maximizing the output of the light from the raster generated under each sensor coincides with an essentially pure, or single color, field over the entire CRT face 10. In color monitors, the red raster is most sensitive to purity changes. Therefore, sensors 8 with red filters 9 are preferred for use with a generated red raster.

Specifically, sensors 8 are located in the four corners of the face 10 of CRT 1 with red filter 9 located between sensor 8 and face 10. Red raster generator 11 is used to input information to red raster gun input port 12. During each field, generator 11 creates a red raster at the locations of the face 10 of CRT 1 which include sensors 8 and filters 9. Maximizing circuit 6 senses the output of sensors 8 and controls generator 5 to maximize sensor output. Therefore, the red gun of CRT 1 is energized within the field of view of sensors 8 which generate output signals which are a function of the "redness" of the reference area on CRT face 10 associated with each sensor. As CRT 1 is exposed to external magnetic fields, sensor outputs will change as a function of the amount of red light detected in a manner described in greater detail hereinafter. By maximizing the average "redness" observed by the sensors 8, external magnetic fields are negated.

Referring to FIG. 3, the red raster 13 generated within the field of view of the sensor 8 has approximately the same cross-sectional area and shape as the sensor 8 and filter 9 associated therewith. However, red raster area 13 may be larger or smaller.

Red raster generator 11 may be a line counter 14 and a pulse generator 15. Counter 14 counts the horizontal lines during each field of display of CRT 1 and activates pulse generator 15 during the intervals of the lines which are within the fields of view 13 of sensors 8. Pulse generator 15 is configured to provide pulses to red raster gun input port 12 so that the red gun is "on" while it is within the field of view of sensors 8. For example, consider a substantially square CRT display of 525 lines with 262.5 lines per field having 240 lines of display. Assume that the sensors 8 are located in the outermost corners of the CRT display and that each sensor covers 1% of the total area of the CRT face. Therefore, the fields of view 13 of the sensor 8 are as follows: the first 10% and the last 10% of the first 24 lines (10%) of display and of the last 24 lines (10%) of display of each field. As a result, pulse generator 15 would be configured to provide an "on" pulse during the first 10% and the last 10% of lines 1–24 and lines 217–240 of each field.

As the display of CRT 1 is exposed to external magnetic fields, the output of sensors 8 will change as a function of the amount of red light observed. This is because the external magnetic field will deflect the electron beam emitted by the red electron gun causing color impurities. The outputs of the sensors 8 are maximized by maximizing circuit 6 which may include peak detectors 16 for detecting the peak excitation of each sensor 8 during each field. Summing circuit 17 sums these detected peaks to provide an output signal which represents the average "redness" of the display for that field. Synchronization of the circuitry is accomplished by using the vertical synchronization signal pulse VS (16.67 millisecond). Upon receipt of a VS pulse, the peak detectors 16 are zeroed. During the next 16.67 millisecond field, each peak detector is charged to an amplitude representative of the red light observed by its corresponding sensor 8. Signals representing the observed light are summed by summing means 17 and stored in first sample and hold circuit 18.

At this point in time, current generator 5 is slightly altered. Specifically, current generator 5 may be an N-bit counter 19 responsive to a delayed VS pulse and connected to an N-bit digital-to-analog converter 20 where N=8, 12 or any other value depending on desired sensitivity. The output of converter 20 may be amplified by a current amplifier 22. Counter 19 is changed by one least significant bit in response to the delayed VS pulse thereby causing the current provided by converter 20 to slightly change.

The next VS pulse resets the peak detectors 16 and the process is repeated. However, during this field the output of summing means 17 is stored in second sample and hold circuit 21. Comparator 22 now compares the data in the first sample and hold circuit 18 with the data in the second sample and hold circuit 21. If the data in the second sample and hold circuit 21 is greater than the data in the first sample and hold circuit 18, the up/down count line remains unchanged because greater data in circuit 21 implies that the change in current generator 5 increased the average "redness" of the display. If the data in circuit 21 is less than the data in circuit 18, the up/down count line is reversed by comparator 22. At this period in time, the delayed VS pulse provided to counter 19 again changes the count by one least significant bit causing the current generated by converter 20 to slightly change. This sequence is continually repeated during each field.

A 12-bit counter and a 12-bit converter may be used as the current generator depending on the size of the sensors and the accuracy desired. In addition, not all bits of the counter need be used. For example, only 9 bits of a 12-bit counter may be used.

Figure 5:
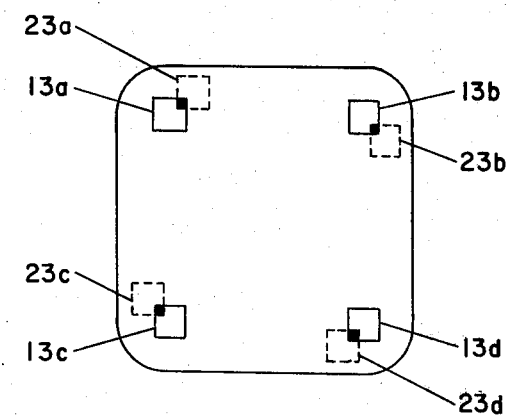
Figure 6:
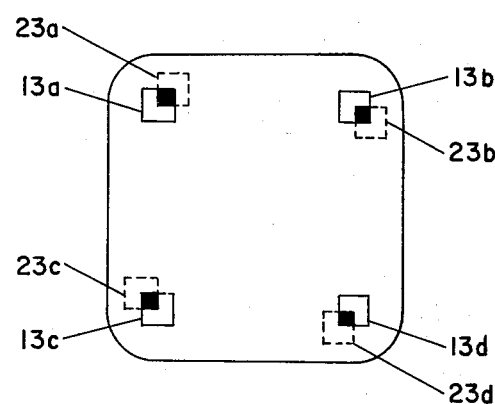
Figure 7:
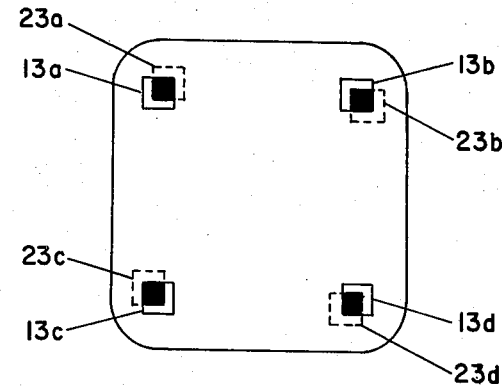

The invention, therefore, functions to maximize the average light output of the sensors 8. In maximizing these outputs, it maximizes the red light output in the fields of view 13 of the sensors 8. This maximizing corresponds to negation of the remaining effects of an external magnetic field which is not compensated for by degaussing coil 2. FIGS. 4–7 are a simplified series of illustrations exemplifying the sequence of correction according to the invention. In FIG. 4, fields of view 13a, 13b, 13c, 13d defined by the solid lines do not coincide with red rasters 23a, 23b, 23c, 23d defined by the dotted lines. The shaded area indicates the overlap. Assume that the invention is initially activated and results in creating a magnetic field which adds to rather than compensates for the external magnetic field. As illustrated in FIG. 5, the fields of view would then coincide even less after such a correction. As a result, the correction provided by current generator 5 would be reversed by reversing the up/down line of counter 19 resulting in initial compensation of the external magnetic field as illustrated in FIG. 6. Since this initial compensation would increase the average "redness" of the display, current generator 5 would remain in the same condition and increase its current generation to further compensate for the external magnetic field as shown in FIG. 7.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

We claim:

1. Apparatus for compensating for an external magnetic field affecting a cathode ray tube (CRT) display, said apparatus comprising:
   (a) means for generating a reference display of a given color in a predetermined area on the face of said CRT;
   (b) means for sensing an optical characteristic of the reference display and generating an output signal representative thereof;
   (c) means for generating a compensating magnetic field about said CRT; and
   (d) means for controlling the strength of said compensating magnetic field in response to said output signal.

2. The apparatus of claim 1 wherein said means for sensing comprises means for sensing the color purity of the reference display in said predetermined area and generating an output signal representative thereof, whereby the purity of the reference display may be maximized resulting in the compensating magnetic field cancelling the effects of said external magnetic field on said CRT.

3. The apparatus of claim 1 wherein said means for generating a reference display comprises a counter for counting lines during a field displayed on said CRT and a pulse generator for applying a pulse to an electron gun of said CRT in response to said counter.

4. The apparatus of claim 1 wherein said means for sensing an optical characteristic comprises means for sensing the intensity of the reference display in said predetermined area and generating an output signal representative thereof, whereby the intensity of the display may be maximized resulting in the compensating magnetic field cancelling at least some of the effects of said external magnetic field on said CRT.

5. The apparatus of claim 4 wherein said means for sensing intensity comprises at least one photosensor located associated with said predermined area on the face of said CRT.

6. The apparatus of claim 5 wherein said means for generating a compensating magnetic field comprises a pair of coils in a Hemholtz configuration located about the face of said CRT.

7. The apparatus of claim 6 wherein said means for controlling comprises a current generator feeding said coils and means for maximizing the intensity detected by said photosensor.

8. The apparatus of claim 7 wherein said means for maximizing comprises a peak detector coupled to said photosensor, first and second sample and hold circuits alternately coupled to said peak detector, and a comparator comparing the output of said first and second sample and hold circuits, said current generator being coupled to an output of said comparator for providing a current whose magnitude corresponds to the output of said comparator.

9. The apparatus of claim 8 wherein said current generator comprises a counter coupled to the output of said comparator and a digital-to-analog converter coupled to the output of said counter, said converter output being coupled to said coils.

10. The apparatus of claim 8 comprising four photosensors, one near each corner of said CRT; four peak detectors, one coupled to each of said photosensors, means for summing the outputs of said detectors, said summing means being alternately coupled to the input of said first and second sample and hold circuits.

11. The apparatus of claim 10 wherein said electron gun is the red electron gun of said CRT and red filters are located between said photosensors and said CRT.

12. The apparatus of claim 11 wherein said counter is an N-bit counter and said converter is an N-bit digital-to-analog converter.

13. The apparatus of claim 12 wherein N=12.

14. The apparatus of claim 12 further comprising means for degaussing said CRT.

15. Apparatus for compensating for an external magnetic field affecting a cathode ray tube (CRT) display, said apparatus comprising:

(a) first means for generating a reference display of a given color in a predetermined area on the face of said CRT, said first means including a first counter for counting lines during a field displayed on said CRT and a pulse generator for applying a pulse to an electron gun of said CRT in response to said first counter;

(b) second means for sensing an optical characteristic of the reference display and generating an output signal representative thereof, said second means including at least one photosensor located associated with said predetermined area on the face of said CRT;

(c) third means for generating a compensating magnetic field about said CRT, said third means including a pair of coils in a Hemholtz configuration located about the face of said CRT; and (d) fourth means for controlling the strength of said compensating magnetic field in response to said output signal, said fourth means including a current generator feeding said coils, a peak detector coupled to said photosensor, first and second sample and hold circuits alternately coupled to said peak detector, and a comparator comparing the output of said first and second sample and hold circuits, said current generator being coupled to an output of said comparator for providing a current whose magnitude corresponds to the output of said comparator.

16. The apparatus of claim 15 wherein said current generator comprises a second counter coupled to the output of said comparator and a digital-to-analog converter coupled to the output of said counter, said converter output being coupled to said coils.

17. The apparatus of claim 16 comprising four photosensors, one near each corner of said CRT; four peak detectors, one coupled to each of said photosensors, means for summing the outputs of said detectors, said summing means being alternately coupled to the input of said first and second sample and hold circuits.

18. The apparatus of claim 17 wherein said electron gun is the red electron gun of said CRT and red filters are located between said photosensors and said CRT.

19. The apparatus of claim 18 wherein said counter is an N-bit counter and said converter is an N-bit digital-to-analog converter.

20. The apparatus of claim 19 wherein N=12.

21. The apparatus of claim 19 further comprising means for degaussing said CRT.

* * * * *